(No Model.)
G. E. BOOSTROM.
SAW.
No. 532,357. Patented Jan. 8, 1895.
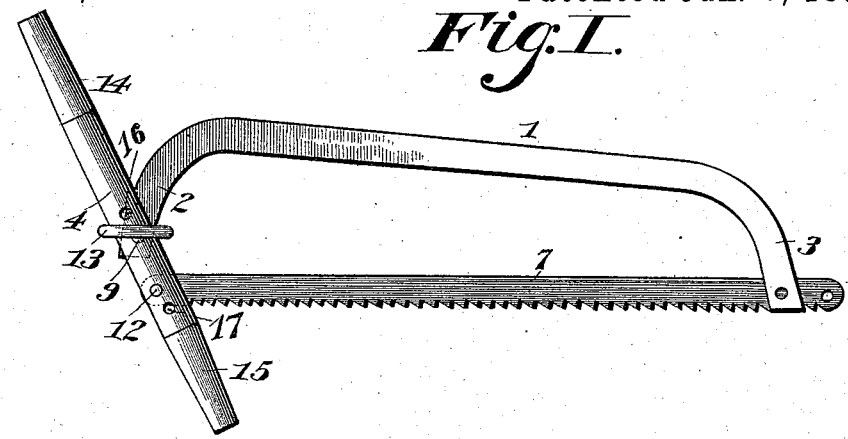
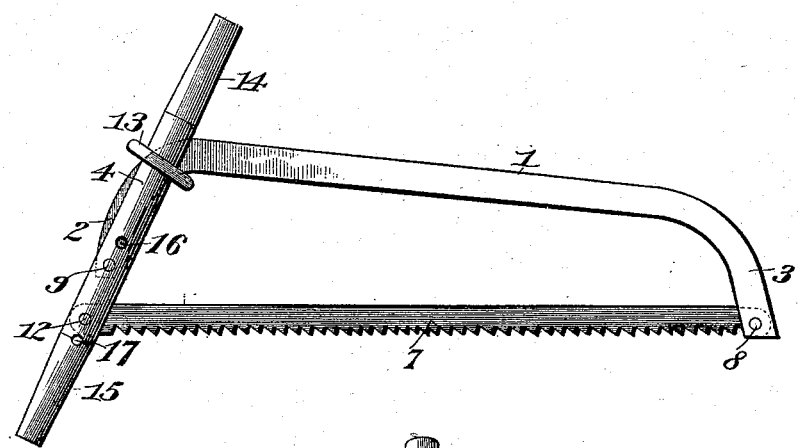
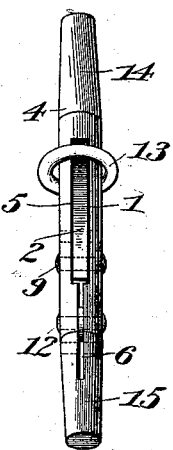
Witnesses
S. N. Acker
J. M. Witherow
Inventor
George E. Boostrom,
By Joseph L. Atkins
Attorney
THE NORRIS PETERS CO., PHOTO-LITHO., WASHINGTON, D. C.

UNITED STATES PATENT OFFICE.

GEORGE ERICK BOOSTROM, OF WATAGA, ILLINOIS.

SAW.

SPECIFICATION forming part of Letters Patent No. 532,357, dated January 8, 1895.

Application filed April 20, 1894. Serial No. 508,328. (No model.)

*To all whom it may concern:*

Be it known that I, GEORGE ERICK BOOSTROM, of Wataga, county of Knox, and State of Illinois, have invented certain new and useful Improvements in Saws, of which the following is a specification, reference being had to the accompanying drawings.

The object of my invention is to produce improvements in saws, especially of the class known as buck saws, whereby greater facility of adjusting the tension on the saw blade is obtained, the strength of the saw is increased, its liability to warp and get out of shape is diminished and practically eliminated, and the distribution of the weight or balance of the saw is improved.

In the accompanying drawings, Figure I is a side elevation of my saw, showing the blade in the unstrung position. Fig. II shows the same with the blade in the tense position; and Fig. III is an end view of the saw looking toward the handle.

Referring to the figures on the drawings: 1 indicates a saw frame that is made of resilient material, preferably spring steel, and which has ends 2 and 3 bent in the same direction as illustrated.

4 indicates the handle of my saw which may be made of any suitable material having sufficient strength for the office required of it, and which is provided with a comparatively broad slot 5 adapted to receive within it the end 2 of the frame 1, and a narrow slot 6 adapted to receive one end of the saw blade 7 that is at its other end secured to the end 3 of the frame as by a pin 8 to the frame 1. The slots 6 and 8 may be merged into one another as illustrated, but this is an immaterial feature.

16 and 17 indicate respectively, graduated apertures in the handle by which the ends of the frame and blade may be pivotally secured, upon pins 9 and 12 in the slots 5 and 6, respectively. The frame and saw blade are in this manner susceptible of a pivotal movement with respect to the handle and capable of various adjustments to or from each other. Inasmuch as they have different pivotal points, the turning of the frame in one direction or upwardly toward the handle, tends, by increasing the distance between the pins that confine the saw blade, to produce tension, in proportion to the amount of force employed, upon the saw blade between its pins. The movement of the frame in the contrary direction tends to cause the pins 8 and 12 to approach closer to one another, and will thereby relieve all strain upon the saw blade, or if continued beyond a certain point the pins 8 and 12 remaining in place will buckle the saw blade. I mention this as indicating the wide limits of adjustment obtainable in my device. From this explanation it will also appear how readily the saw may be adjusted for work or for the withdrawal of the pins 8 and 12 and the removal of the blade for repairs when necessary.

Having provided in the manner above described for the convenient regulation of the tension of the saw blade, it merely remains to devise mechanism for fixing the adjustment of the blade in the tense position required for work. For this purpose a simple and convenient means is supplied by a ring 13 that surrounds the handle, and the inclosed end 2 of the frame 1. When slipped above the pivot pin 9 of the frame it will prevent the frame from turning upon its pivot, and will therefore hold it in any position to which it is set, thereby regulating the tension upon the saw blade. In use all that is necessary for adjusting the tension of the blade is for the operator to press the end 3 of the frame forcibly against a suitable support, thus rendering the length of the frame available for leverage, and when the tension of the blade is properly secured to slip the ring into position to hold the frame in place.

A remaining feature incidental to the construction of my saw as described consists in grasps 14 and 15 projecting respectively from the handle above and below the frame.

What I claim is—

1. In a saw, the combination with a handle and blade pivoted thereto, of a frame bent at both ends in the same direction, one end thereof being pivoted to the free end of the blade, the other end thereof pivoted to the handle, and means for adjusting the relation of the bend of the last-named end of the frame to the handle, substantially as set forth.

2. In a saw, the combination with a handle, and blade pivoted thereto at one end, of a frame bent at both ends in the same direction, and pivoted at one end to the free end of the blade, a slot or recess in the handle, means for pivoting the other end of the frame therein, and a movable band surrounding the handle and the bent portion of the frame connected therewith, substantially as and for the purpose specified.

3. In a saw, the combination with a handle, frame and blade pivoted to each other, and respectively pivoted at different points to the handle, of a ring surrounding the handle and the end of the frame pivoted thereto and adapted to secure the adjustment of the one to the other, substantially as specified.

4. In a saw, the combination with a handle, frame and blade, of mechanism for adjustably pivoting the frame and blade upon the handle and a ring surrounding the handle and the end of the frame pivoted thereto and adapted to secure the adjustment of the one to the other, substantially as specified.

In testimony of all which I have hereunto subscribed my name.

GEORGE ERICK BOOSTROM.

Witnesses:
W. NELSON,
W. CORTRIGHT.